Jan. 27, 1970  R. L. BOGGS ET AL  3,492,054
TRACK HINGE JOINTS WITH ROTATING BUSHINGS
Filed Dec. 29, 1967
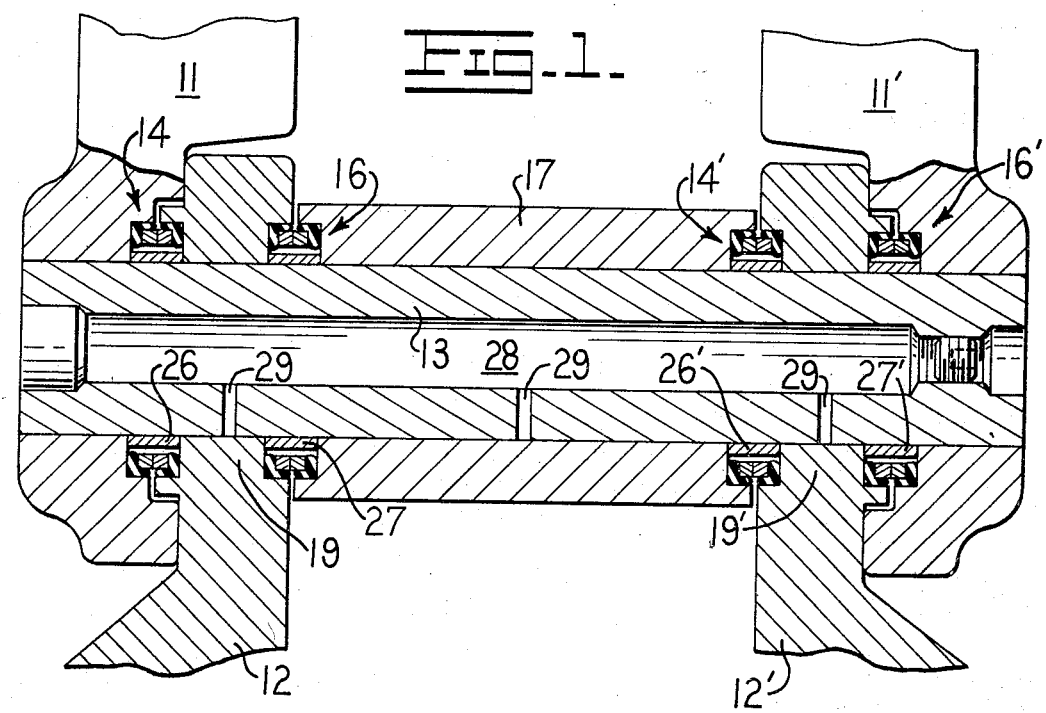
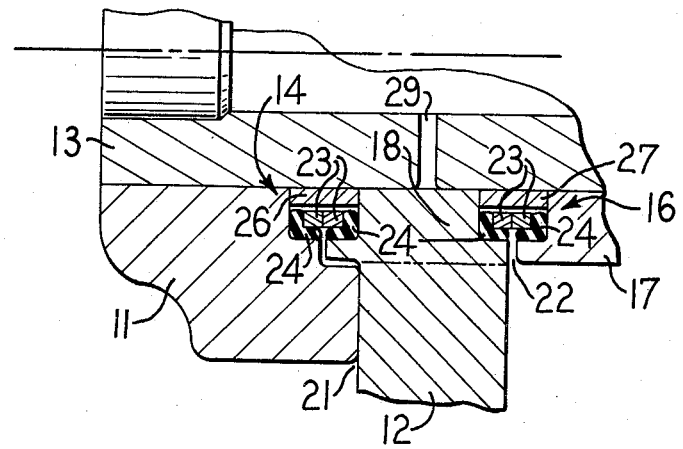
INVENTORS
ROGER L. BOGGS
FLOYD S. DADDS
BY
ATTORNEYS 3,492,054
TRACK HINGE JOINTS WITH
ROTATING BUSHINGS
Roger L. Boggs, East Peoria, and Floyd S. Dadds, Peoria,
Ill., assignors to Caterpillar Tractor Co., Peoria, Ill., a
corporation of California
Filed Dec. 29, 1967, Ser. No. 694,510
Int. Cl. B62d 55/20
U.S. Cl. 305—11                                   2 Claims

ABSTRACT OF THE DISCLOSURE

A heavy duty track hinge joint having a rotatable central bushing for reduced wear on its external surfaces and reduced noise during operation together with a plurality of metal face seal assemblies for permitting permanent lubrication of the hinge joint.

Cross-reference to related U.S. patents

An exemplary seal assembly suitable for use in the present track hinge joint is described in greater detail in U.S. patent application Ser. No. 443,312 filed by Harold L. Reinsma et al. on Mar. 29, 1965, now U.S. Patent No. 3,392,984 and assigned to the assignee of the present invention.

Commonly used track chains for earth moving vehicles comprise a plurality of track links. The track links are connected into two parallel endless chains by means of track link hinge joints having track pins joining the ends of adjacent pairs of links and spanning the space between the parallel chains. Drive sprockets drive the track chains and provide locomotion for the vehicle by acting against bushings upon the track pins. For efficient and low cost operation, it is desirable to construct the track chain in a manner to provide for long, trouble-free operating life. However, great stress is exerted upon the track chain and particularly in its track link hinge joints by the extremely heavy load to be supported thereon and the terrain over which they commonly operate. Additionally, the typical environment of such vehicles contains considerable abrasive material such as sand, dust and mud. Under these conditions, there are two portions of the track chain which are particularly susceptible to wear or abrasion. One of these portions consists of the track link hinge joints which are susceptible to entry and abrasion by abrasive materials. The abrasive materials tend to increase surface abrasion of relatively rotating parts in the hinge joints and thus shorten operating life. Numerous seals have been provided in the prior art which are effective in varying degrees to prevent entry of such abrasives into conventional track hinge joints. The seals provide the additional advantage of retaining lubricants within the joints to permit permanent lubrication of those parts.

The other portion consists of the track pin bushings. Force for driving the track by a sprocket is received upon a given portion of the bushing. Additionally, as each such bushing comes into engagement with or tends to be disengaged from the sprocket, there is relative pivotal motion between the two adjacent links. Since the bushing is conventionally secured to one of these links, at least partly in order to permit effective sealing of the hinge joint, it is caused to rotate while in engagement with the sprocket. The rotation of the bushing against the sprocket is commonly referred to as "scrubbing" and causes substantial abrasion of the bushing. Prior art efforts to provide long life bushings in conjunction with sealed hinge joints have been directed at compensating for such abrasion of the bushings rather than eliminating or reducing the amount of abrasion. For example, one method has been to increase the thickness of each bushing at its point of contact with the sprocket. An alternative or conjunctive approach has been to reverse the bushing after wear so that such abrasion occurs on different portions of the bushing surface.

However, it is apparent that such compensating approaches are undesirable where a long operating life is desired for the track chain. Reversing the bushing, for example, requires disassembly and reassembly of the track chain which is undesirable. Rather, it is desirable that the track chain be designed to have an effective life at least equal to the operating life of the vehicle prior to overhaul. At that time, the track chain may be conveniently rebuilt along with other components of the vehicle.

To achieve that purpose, the present invention contemplates provision of a track link assembly having sealed hinge joints between adjacent links and a central track pin bushing capable of rotation relative to both of the track links.

Accordingly, it is an object of the present invention to provide, in a track link assembly having sealable hinge joints, a pin bushing which experiences substantially reduced external wear during operation.

Another object is to provide a track link assembly which has sealable track hinge joints and is operable with substantially less noise compared to conventional designs. With reference to the above discussion, the "scrubbing" action between the track pin bushing and the sprocket is a source of very irritating and objectionable noise during operation of a crawler type vehicle.

Other objects and advantages of the present invention will be made apparent from the following description having reference to the accompanying drawings wherein:

FIG. 1 is a central sectional view of a track link hinge joint taken along the axis of the track pin with the major portion of the track links being broken away; and FIG. 2 is an enlarged fragmentary view of one end of the hinge joint of FIG. 1 to illustrate in greater detail the manner of sealing.

A hinge joint between successive track links in a track chain is illustrated in FIG. 1 wherein one pair of the track links is represented by projecting ends 11 and 11' which are to be pivotally secured to projecting ends 12 and 12' of adjacent links. The track link ends have bores which are coaxially aligned to receive a track pin 13. The track pin is secured to the outer track link ends 11 and 11' as by press fit in their bores. Since the track hinge joint is generally symmetrical as seen in FIG. 1, the left end of the hinged joint will be described in detail while similar features at the right end of the hinge joints are indicated with similar prime numerals. The track hinge joint has a plurality of sealing assemblies, indicated at 14 and 16, which permit effective sealing of the joint while a central bushing 17 is free for rotation relative to both sets of track link ends. The track link end 12 is disposed for rotation about the track pin inside of the track link end 11. The end 12 has bearing means adjacent the track pin 13 to provide for pivoting or rotational motion of the end 12 about the pin. As indicated at 19 in FIG. 1, the bearing means is preferably an integral portion of the end 12 to simplify manufacture of assembly. However, the bearing may also be a replaceable bushing, as indicated at 18 by a broken line in FIG. 2, secured to the end 12 as by press-fit. Having particular reference to FIG. 2, a juncture 21 is formed between the outer track link end 11 and the inner track link end 12 and another juncture 22 between the inner track link end 12 and the central bushing 17, either of which may permit abrasive material to enter the hinge joint or permit lubricant to escape therefrom. To prevent either the entry of abrasive material or the escape of lubricant, the seal assemblies 14 and 16 are respectively disposed in annular cavities formed along each of the junctures 21 and 22. Although there are a variety of seal assemblies for accomplishing effective sealing in such a track hinge joint, the present seal assemblies 14 and 16 are preferably of a type having pairs of annular seal members 23 with abutting face surfaces of hardened metal. A resilient load member 24 is disposed for interaction between each of the seal members 23 and an adjacent surface of a relatively rotating part of the track hinge joint so that the two seal members are urged together into sealing relation. To maintain a prescribed preload condition between each pair of seal members according to their respective resilient loading members, a spacer 26 is associated with the seal assembly 14. The spacer 26 controls the spacing between the outer track link end 11 and the inner track link end 12. A similar spacer 27 controls spacing between the inner track link end 12 and the rotatable central bushing 17. The seal assemblies 14 and 16 are particularly described herein for purposes of example only while being described in much greater detail in the above noted patent application.

A supply of lubricant for the load bearing surfaces of the track pin 13 which interact with the inner track link ends and the central bushing 17 is assured by a large reservoir 28 which is axially formed within the track pin 13. Lubricant from the reservoir is communicated to the load bearing surfaces by orifices 29 formed radially in the track pin.

We claim:
1. A track hinge joint as a portion of an endless track providing for pivotal interaction between adjacent track links and including a cylindrical pin, outer ends of one of the links being secured to the ends of the pin, bearing surfaces associated with respective inner ends of the other link and rotatably supporting them directly in pivotal relation upon the pins inwardly of the respective outer link ends, a central bushing of less width than the inner links being arranged between the inner track link ends and in coaxial relation directly upon the pin, said central bushing having an inner cylindrical surface arranged for relative rotation about the pin, said central bushing being relatively rotatable with relation to the inner track link ends, means providing for lubrication of said bearing surfaces associated with the inner track link ends and of the inner cylindrical surface of said bushing, and rotary seal assemblies arranged between adjacent pairs of the inner and outer track link ends and between the inner track link ends and adjacent ends of said central bushing each of said seal assemblies having spacer means associated therewith for maintaining proper seal engagement.

2. The invention of claim 1 wherein said lubrication means comprises a lubricant reservoir formed within the pin, the reservoir being in communication with said bearing surfaces and the inner cylindrical surface of said bushing by means of radial passages formed in the pin.

References Cited
UNITED STATES PATENTS

| | | | |
|---|---|---|---|
| 2,336,913 | 12/1943 | Albrecht | 305—14 |
| 2,939,747 | 6/1960 | Tucker | 305—57 |
| 3,365,246 | 1/1968 | Otis | 305—58 X |
| 3,409,336 | 11/1968 | Dadds | 305—11 |

FOREIGN PATENTS

| | | |
|---|---|---|
| 538,500 | 8/1941 | Great Britain. |
| 833,547 | 4/1960 | Great Britain. |

RICHARD J. JOHNSON, Primary Examiner

US. Cl. X.R.

305—14